(12) United States Patent
Rigaud et al.

(10) Patent No.: US 8,191,229 B2
(45) Date of Patent: Jun. 5, 2012

(54) ROTOR FOR A ROTARY ELECTRICAL MACHINE COMPRISING GROOVES FOR MAGNETS

(75) Inventors: Stephane Rigaud, Saint Maurice (FR); Marc Tunzini, Versailles (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 13/150,519

(22) Filed: Jun. 1, 2011

(65) Prior Publication Data

US 2011/0283524 A1    Nov. 24, 2011

Related U.S. Application Data

(62) Division of application No. 12/296,570, filed on May 5, 2009.

(30) Foreign Application Priority Data

Apr. 10, 2006 (FR) ..................................... 06 51297
Mar. 13, 2007 (WO) ................ PCT/FR2007/050920

(51) Int. Cl.
*H02K 15/03* (2006.01)
*H02K 15/00* (2006.01)
*H02K 1/27* (2006.01)
*H02K 1/28* (2006.01)
*H02K 19/22* (2006.01)

(52) U.S. Cl. ....... 29/598; 29/596; 310/263; 310/156.66; 310/156.72

(58) Field of Classification Search ................ 29/596, 29/598; 310/263, 156.66, 156.72; H02K 15/00, H02K 15/03, 1/27, 1/28, 19/22
See application file for complete search history.

(56) References Cited

U.S. PATENT DOCUMENTS

| | | | |
|---|---|---|---|
| 5,578,885 A | 11/1996 | Alford et al. | |
| 6,486,585 B1 * | 11/2002 | Badey et al. | 310/263 |
| 6,526,646 B2 * | 3/2003 | York et al. | 29/596 |
| 6,833,651 B2 | 12/2004 | Pflueger | |
| 6,882,081 B2 * | 4/2005 | Isoda et al. | 310/263 |
| 6,897,597 B1 | 5/2005 | Armiroli et al. | |
| 7,135,803 B2 | 11/2006 | Maeda et al. | |
| 2001/0011856 A1 | 8/2001 | Asao et al. | |
| 2002/0117935 A1 | 8/2002 | Kanazawa et al. | |
| 2005/0236927 A1 | 10/2005 | Maeda et al. | |
| 2007/0228866 A1 | 10/2007 | Nakamura | |

FOREIGN PATENT DOCUMENTS

EP    1643615 A1    4/2006

* cited by examiner

*Primary Examiner* — Quyen Leung
*Assistant Examiner* — Michael Andrews
(74) *Attorney, Agent, or Firm* — Jacox, Meckstroth & Jenkins

(57) ABSTRACT

A rotor for an electrical machine that comprises two parallel magnet wheels, each of which comprises axial teeth so that each tooth on a wheel is situated in the space existing between two consecutive teeth on the other wheel, and that comprises magnetic elements, each arranged between two adjacent teeth and partly received in a groove produced in each of the opposite lateral faces of the two adjacent teeth. In one embodiment, each of the two adjacent teeth comprises one groove at a maximum, which emerges at the base of the first tooth.

6 Claims, 2 Drawing Sheets

ROTOR FOR A ROTARY ELECTRICAL MACHINE COMPRISING GROOVES FOR MAGNETS

CROSS-REFERENCE TO RELATED APPLICATIONS

This application is a division of U.S. patent application Ser. No. 12/296,570 filed May 5, 2009, which claims priority to PCT Application PCT/FR2007/050920 filed Mar. 13, 2007 and also to French Application No. 0651297 filed Apr. 10, 2006, which applications are incorporated herein by reference and made a part hereof.

BACKGROUND OF THE INVENTION

1. Field of the Invention

The invention concerns a rotor for a rotary electrical machine that comprises two parallel magnet wheels that extend radially with respect to a principal axis of the rotor, each of which comprises a series of axial teeth, roughly trapezoidal in shape, that extend axially from the external radial end edge of the magnet wheel, in the direction of the other magnet wheel, so that each tooth on a magnet wheel is situated in the space existing between two consecutive teeth on the other magnet wheel, and that comprise magnetic elements, such as permanent magnets, each of which is arranged between two adjacent teeth each belonging to one of the two magnet wheels, and is received partly in a groove produced in each of the opposite lateral faces of the two adjacent teeth, so that at least one of the two lateral faces of a first tooth of the two adjacent teeth comprises a groove in which a magnetic element is partly received, and so that each groove that is produced in a lateral face of a tooth of a rotor emerges at a first axial end of the tooth, where the first tooth is connected to the external radial end edge of the magnet wheel, or at a second free axial end of the tooth. The number of magnetic elements may be less than the number of teeth on a magnet wheel.

2. Description of the Related Art

According to a known embodiment, the two grooves that are produced in two opposite faces of two adjacent teeth are produced by means of a single tool, for example a milling cutter, after the two magnet wheels of the rotor have been mounted on a central shaft of the rotor.

It is also known how to produce all the grooves in the rotor so that they emerge at the same axial end of the rotor.

Consequently, when the two lateral faces of one and the same tooth on a pole wheel each comprise a groove receiving a magnetic element, the two grooves emerge axially either at a first axial end of the tooth where the tooth is connected to the edge of the radial end of the magnet wheel, or at the free axial end of the tooth, also referred to as the tip of the tooth.

The first axial end of the tooth, also referred to as the base of the tooth, where the tooth is connected to the magnet wheel, is then made less resistant to deformation when the two grooves in the tooth emerge at this base of the tooth, compared with an embodiment according to which the two grooves emerge at the free axial end of the tooth.

Thus, when the rotor is rotated at high speed, the reduction in the resistance to deformation of the base of the tooth means that the tooth deforms radially with respect to the rotor, and there is then a risk that the tooth may come into contact with the stator of the rotating electrical machine.

What is needed, therefore, is an improved rotor that overcomes one or more of the problems and risks of the prior art.

SUMMARY OF THE INVENTION

The aim of the invention is to propose a rotor for a rotary electrical machine for which the grooves receiving the magnetic elements are produced so that the reduction in the elastic resistance to deformation of the base of each tooth is limited.

For this purpose, the invention proposes a rotor of the type described above, wherein each of the two adjacent teeth comprises one groove at a maximum, which emerges at the base of the first tooth.

According to other characteristics of the invention:

- each of the two adjacent teeth comprises a groove produced solely in one of its lateral faces, the two grooves being opposite each other, and the groove that is produced in the lateral face of the first tooth emerges at the base of the first tooth, and the groove that is produced in the lateral face of the second tooth of the two adjacent teeth emerges at the tip of the second tooth;
- the two lateral faces of the first tooth each comprise a groove;
- the two grooves that are produced in the two lateral faces of the first tooth emerge at the tip of the first tooth;
- a first one of the two grooves that are produced in the lateral faces of the first tooth emerges at the base of the first tooth and the second one of the two grooves that are produced in the lateral faces of the first tooth emerges at the tip of the first tooth;
- each of the two lateral faces of each tooth comprises a groove that partly receives a magnetic element, and a single lateral face of each tooth comprises a groove that emerges at the base of the associated tooth, the other lateral face of the tooth comprising a groove that emerges at the free axial end of the tooth, also referred to as the tip of the tooth;
- the two grooves that are produced in the opposite faces of the two adjacent tooth and that receive the same magnetic element both emerge at the same axial end of the rotor; the magnet or magnetic element is introduced between the two teeth on the side where the adjacent grooves emerge;
- all the grooves emerge at the same axial end of the rotor;
- all the grooves that are able to receive a magnetic element that is situated between a tooth on a first magnet wheel and a tooth on the second magnet wheel that is situated angularly upstream of the tooth on the first magnet wheel emerge at a first axial end of the rotor, and all the grooves that are able to receive a magnetic element that is situated between a tooth on a first magnet wheel and a tooth on the second magnet wheel that is situated angularly downstream of the tooth on the first magnet wheel emerge at a second axial end of the rotor;
- the number of magnetic elements is equal to the total number of teeth on the rotor;
- the number of magnetic elements is less than the total number of teeth on the rotor;
- the rotor comprises at least one pair of magnetic elements, where each magnetic element in the pair is arranged, angularly with respect to the principal axis of the rotor, on each side of the first tooth;
- the number of magnetic elements is equal to the number of teeth that a single magnet wheel has, and each magnetic element is received between a tooth on a first magnet wheel and a tooth on the second magnet wheel that is situated angularly, with respect to the principal axis of the rotor, upstream of the tooth on the first magnet wheel. The magnetic element is therefore always situated on the same side of each tooth on the first magnet wheel.

The invention also proposes a method of producing a rotor, which comprises:
- a step of assembling two magnet wheels so that each tooth on a magnet wheel is situated in the space existing between two consecutive teeth on the other magnet wheel;
- a step of machining the lateral faces of the teeth in order to produce the grooves receiving the magnetic elements, so that each of the two lateral faces of each tooth comprises a groove that is able to partly receive a magnetic element;
- a step of mounting each magnetic element in two grooves that are produced in the opposite faces of two adjacent teeth, wherein the machining step comprises a first phase of producing the grooves that emerge at a first axial end of the rotor and then a second phase of producing grooves that emerge at a second axial end of the rotor.

In this way the grooves that are able to receive a magnetic element that is situated between a tooth on a first magnet wheel and a tooth on the second magnet wheel that is situated angularly upstream of the tooth on the first magnet wheel emerge at a first axial end of the rotor and the grooves that are able to receive a magnetic element that is situated on a tooth on a first magnet wheel and a tooth on the second magnet wheel that is situated angularly downstream of the tooth on the first magnet wheel emerge at a second axial end of the rotor. In this way machining is carried out once on one side of the rotor and once on the other side. The grooves have an angle with respect to the base of the magnet wheels; this is because, each tooth being trapezoidal in shape, the inter-pole zone forms an angle towards the right on the left-hand side of the tooth and an angle to the left on the right-hand side of the tooth. The machining therefore takes place with a different angle according to the side of the tooth. It is thus possible, for example, to produce all the grooves oriented towards the left, that is to say the right-hand side of the tooth in question, and then all the grooves oriented to the right, that is to say the left-hand side of the tooth in question.

According to other characteristics of the method according to the invention:
- each phase of the machining step consists of simultaneously producing the two grooves in a pair of grooves, which are able to receive one and the same magnetic element;
- each phase of the machining step consists of producing successively the pairs of grooves that emerge at the same axial end of the rotor.

These and other objects and advantages of the invention will be apparent from the following description, the accompanying drawings and the appended claims.

Other characteristics and advantages of the invention will emerge clearly from a reading of the following detailed description, for an understanding of which reference will be made to the accompanying figures, among which:

BRIEF DESCRIPTION OF THE ACCOMPANYING DRAWINGS

DETAILED DESCRIPTION OF THE PREFERRED EMBODIMENTS

Figure 1:
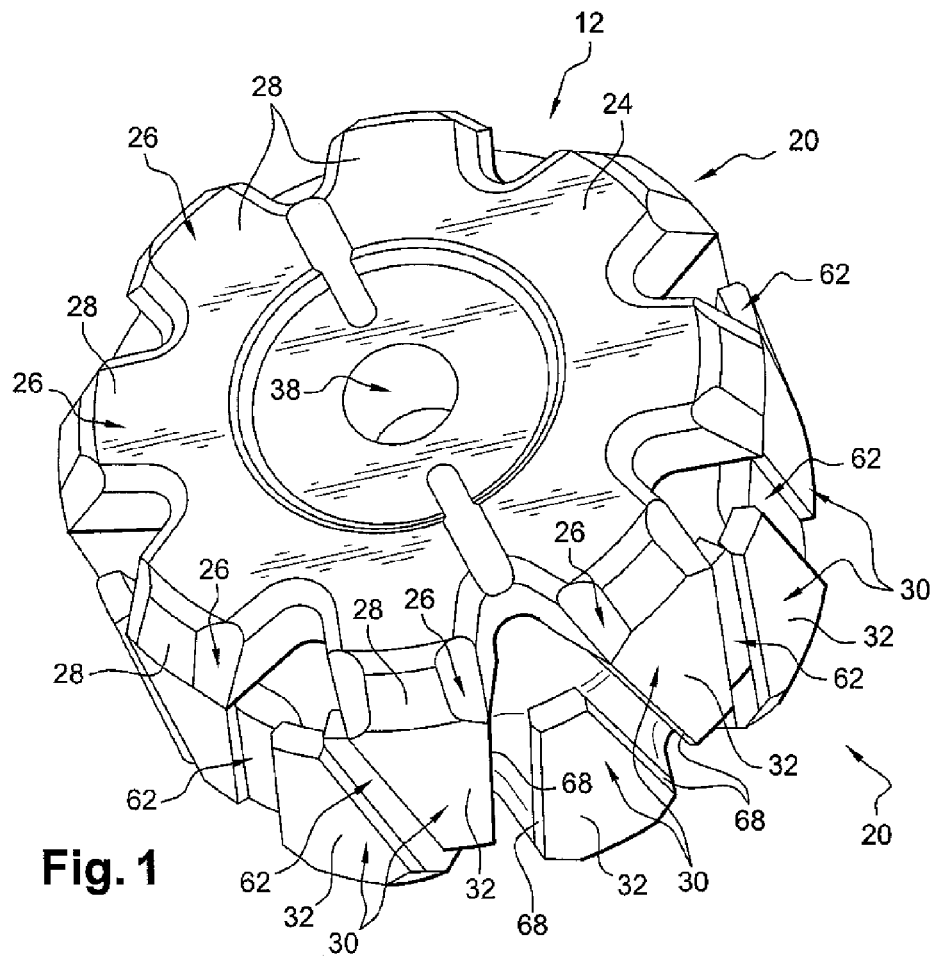
FIG. 1 is a schematic representation in perspective of the magnet wheels on a rotor of a rotary electrical machine, which comprises magnets mounted in grooves produced in the teeth according to the invention.
Figure 2:
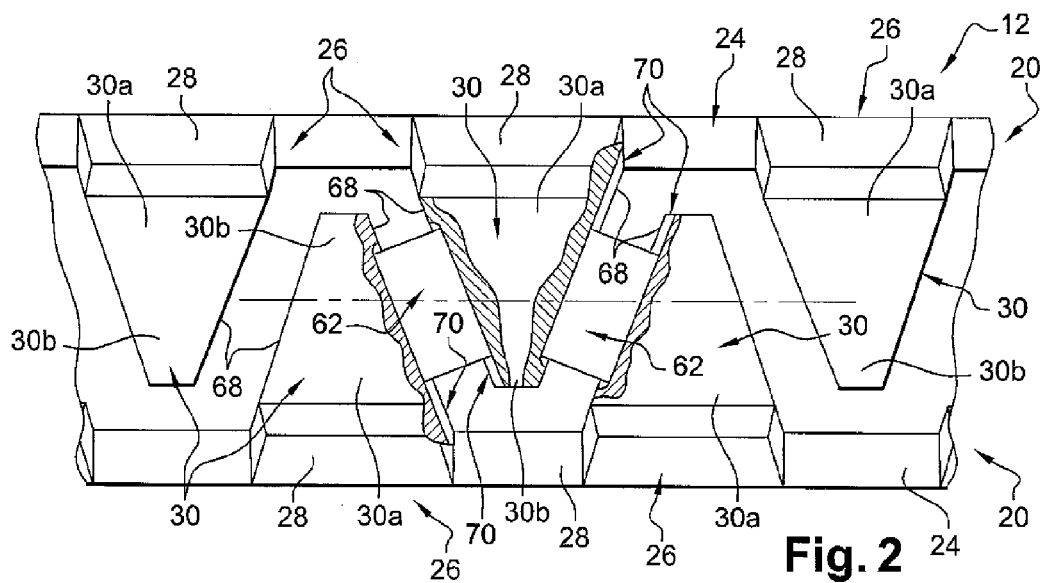
FIG. 2 is a partial linear development with cutaway of the axial teeth of the two magnet wheels depicted in FIG. 1, showing a first embodiment of the grooves according to the invention.

In the description of the invention that follows, the orientation from upstream to downstream will be used as being the tangential direction with respect to the principal axis of the rotor and from left to right as seen in FIG. 2. The bottom orientation corresponds to the bottom part of FIGS. 1 to 5.

FIG. 1 depicts a rotor 12 for a rotary electrical machine, such as for example an alternator of the three-phase type, for a motor vehicle with a thermal engine, or an alternator/starter for in particular starting the thermal engine of a vehicle.

The rotor 12 is a rotor of the claw type and comprises two magnet wheels 20 juxtaposed axially and each having an annular-shaped radial flange 24 that is provided at its external periphery with claws 26.

An excitation winding (not shown) is located axially between the flanges 24 of the magnet wheels 20 and is carried by a part of the rotor 12 in the form of a cylindrical core (not shown) coaxial with the magnet wheels 20.

Each claw 26 comprises a root portion 28 that is extended at its external periphery by a tooth 30 with an axial principal orientation with respect to the principal axis of the rotor 12.

The teeth 30 are trapezoidal in shape and are directed axially towards the flange 24 of the other magnet wheel 20, the tooth 30 of a magnet wheel 20 being received in the space existing between two consecutive teeth 30 on the other magnet wheel 20, so that the teeth 30 on the magnet wheels 20 are interleaved.

Each tooth 30 comprises in particular an external axial end face 32 and two roughly planar lateral faces 68, forming two of the sides of the trapezium.

Each lateral face 68 of a first tooth 30 belonging to a first magnet wheel 20 extends parallel to and at a substantially constant distance from an opposite lateral face 68 of a second tooth 30 belonging to the other magnet wheel 20.

Subsequently, two teeth 30, each of which belongs to one of the magnet wheels 20, and possessing a lateral face 68 opposite the lateral face 48 of the other tooth 30, will be designated as being two adjacent teeth 30.

The rotor 12 also comprises magnetic elements 62 such as permanent magnets, which are interposed between two adjacent teeth 30, in order to reduce leakages of magnetic flux at the space between two adjacent teeth 30, and in order to reinforce the magnetic flux.

According to one embodiment, the number of these magnets 62 is determined so that it is less than the number of teeth 30 on the rotor 12.

In the embodiment of the rotor depicted in FIG. 1, each magnet wheel 20 of the rotor 12 comprises eight teeth 30, and the rotor 12 therefore comprises eight pairs of poles.

The number of magnets 62 on the rotor 12 can be determined so that it is less than the number of poles of the rotor 12, for example eight magnets 62 for eight pairs of poles.

As can be seen in FIGS. 2 to 5, each magnet 62 that is interposed between two adjacent teeth 30 is received in a groove 70 produced in each of the opposite lateral faces 68 of the two adjacent teeth 30.

Each groove 70, which is produced in a lateral face 68 of a tooth 30, extends in the roughly axial direction of the lateral face 68 of the tooth 30, between a base 30a of the tooth 30 at which the tooth 30 is connected to the root portion 28 of the claw 26 and therefore to the external radial end edge of the magnet wheel 20, and a second free axial end or tip 30b of the tooth 30, also referred to as the tip of the tooth.

Figure 3:
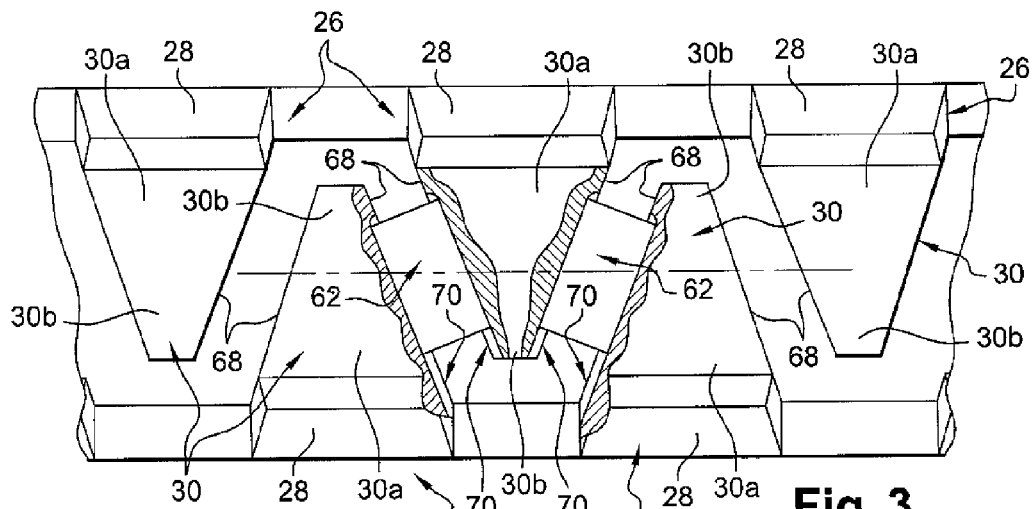
FIG. 3 is a view similar to that in FIG. 2, showing a second embodiment of the invention.

According to a known embodiment, the two grooves 70 that are produced in the two opposite lateral faces 68 of the two adjacent teeth 30 are produced simultaneously, for example by milling, so that the two grooves 70 both emerge at their axial end situated at one and the same axial end of the rotor 12, for example the bottom axial end, as depicted in FIG. 3, so as to facilitate the introduction of the magnetic element.

Consequently, and as can be seen in FIGS. 2 to 5, one of the two grooves 70 that are produced in the opposite lateral faces 68 and that receive the same magnet 62 emerges at the base 30a of the tooth 30, on the first magnet wheel 20, in which the groove is produced, and the other groove 70 emerges at the tip 30b of the tooth 30, of the second magnet wheel 20, in which this second groove 70 is produced.

In accordance with the invention, each tooth 30 that comprises a groove 70 produced in one or other or both of its lateral faces 68, that is to say each of the two adjacent teeth 30, comprises one groove 70 at a maximum that emerges at the base 30a of the tooth 30.

Thus a single groove 70 in each tooth 30, or no groove 70 in each tooth 30, emerges at the base 30a of the tooth 30.

FIGS. 2 and 3 depict a first embodiment of the invention in which the rotor 12 comprises a number of magnets 62 that is less than the number of poles on the rotor 12, that is to say less than the number of teeth 30 on the rotor 12. The magnets 62 can be mounted in pairs.

The two magnets 62 in the same pair are arranged on each side of a tooth 30 on one of the two magnet wheels 20, which will be referred to hereinafter as the first tooth 30.

Each of the two lateral faces 68 of the first tooth 30 consequently comprises a groove 70 receiving one of the two magnets 62 of the pair of magnets, and the lateral face 68 of each of the two teeth 30 of the other magnet wheel 20 adjacent to the first tooth 30, which is opposite a lateral face 68 of the first tooth 30, also comprises a groove 70 receiving one of the two magnets 62.

In accordance with the invention, at a maximum one groove 70 that is produced in one of the lateral faces 68 of the first tooth 30 emerges at the base 30a of the first tooth 30.

According to a first embodiment of the invention depicted in FIG. 2, a groove 70 emerges at the base 30a of the first tooth 30 here the groove 70 that is situated downstream of the first tooth 30.

Consequently the other groove 70 that is produced in the first tooth 30 and that is situated upstream of the first tooth 30 emerges at the second free axial end 30b of the first tooth 30 and does not emerge at the base 30a of the first tooth 30.

In addition, the groove 70 that is produced in the lateral face 68 of the tooth 30 adjacent to the first tooth 30 and that is situated upstream of the first tooth 30 emerges at the base 30a of the tooth 30, and the groove 70 that is produced in the lateral face 68 of the tooth 30 adjacent to the first tooth 30 and that is situated downstream of the first tooth 30 emerges at the tip 30b of the tooth 30.

Consequently the two grooves 70 that receive the magnet 62 situated upstream of the first tooth 30 emerge at a first axial end of the rotor 12, here the bottom axial end, and the two grooves 70 receiving the magnet 62 situated downstream of the first tooth 30 emerge at the second axial end of the rotor 12, here the top axial end.

FIG. 3 depicts the second embodiment of the invention according to which neither of the two grooves 70 produced in the lateral faces 68 of the first tooth 30 emerges at the base 30a of the first tooth 30, that is to say they emerge at the tip 30b of the tooth 30.

Consequently, the groove 70 that is produced in the lateral face 68 of each of the two teeth 30 adjacent to the first tooth 30 emerges at the base 30a of the tooth 30.

According to this variant embodiment, all the grooves 70 that receive the magnets 62 of the pair of magnets 62 associated with the first tooth 30 emerge at the same axial end of the rotor 12, which is here the bottom axial end as seen in FIG. 3.

Figure 4:
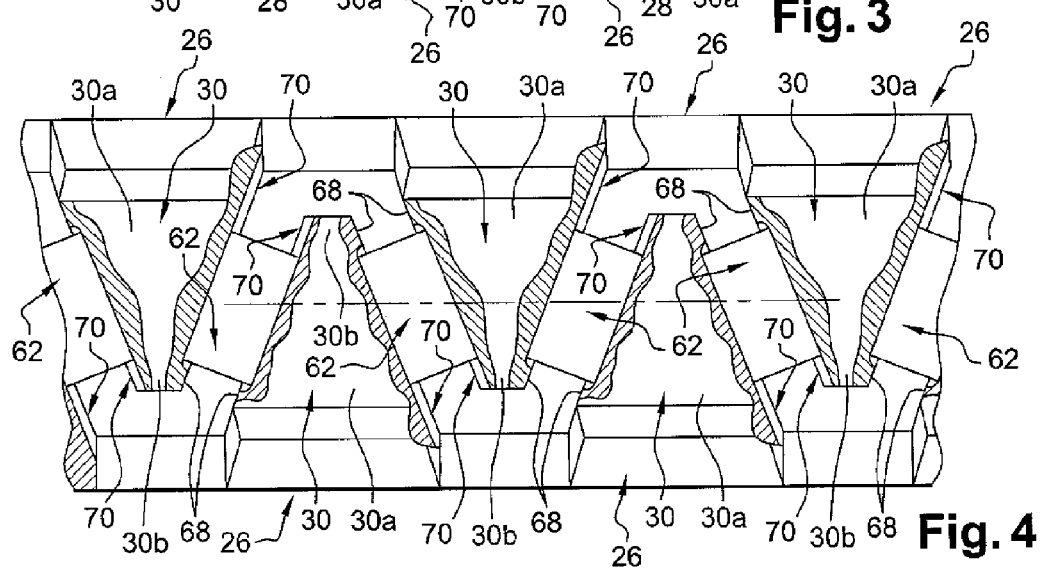
FIG. 4 is a view similar to those in FIGS. 2 and 3, showing a third embodiment of the invention.

FIG. 4 depicts a third embodiment of the invention according to which the rotor 12 comprises a number of pairs of magnets 62 that is equal to the number of poles on the rotor 12.

Consequently the rotor 12 comprises a magnet 62 that is arranged in each space existing between two adjacent teeth 30, and each tooth 30 on the rotor 12 comprises a groove 70 produced in each of its two lateral faces 68, which receives a magnet 62. There are therefore as many magnetic elements as there are inter-pole spaces.

In accordance with the invention, a single groove 70 that is produced in each tooth 30 emerges at the base 30a of the tooth, that is to say it does not emerge at the tip 30b of the tooth 30, and the other groove 70 of the tooth 30 emerges at the tip 30b of the tooth 30 and therefore does not emerge at the base 30a of the tooth 30. It is then seen that the grooves 70 that receive the magnets 62 situated at a first side of the teeth 30 of a first magnet wheel 20 all emerge at the same axial end of the rotor 12, and, reciprocally, the groove 70 that received the magnets 62 situated on the other side of the teeth 30 on the first magnet wheel 20 all emerge at the other axial end of the rotor 12. The grooves thus in alternation and successively emerge at the top or at the bottom.

Figure 5:
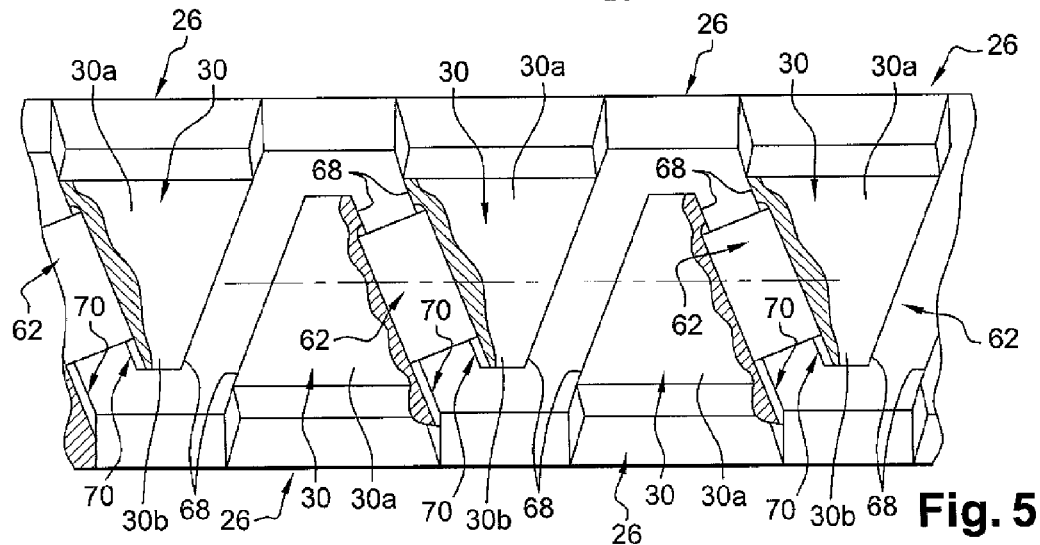
FIG. 5 is a view similar to those in FIGS. 2, 3 and 4, showing a fourth embodiment of the invention.

For example, here, the grooves 70 that receive the magnets 62 situated downstream of the teeth 30 on the bottom magnet wheel 20 emerge at the bottom axial end of the rotor 12, and the grooves 70 that receive the magnets 62 situated upstream of the teeth 30 on the bottom magnet wheel 20 emerge at the top axial end of the rotor FIG. 5 also depicts a fourth embodiment of the invention according to which the rotor 12 comprises a number of magnets 62 that is equal to the number of teeth 30 that a single magnet wheel 20 has. In addition, according to this embodiment, only one lateral face 68 of each tooth 30 comprises a groove 70.

Thus each tooth 30 on a magnet wheel 22 is associated with a single magnet 62, and two adjacent teeth 30 each belonging to one of the two magnet wheels 20 and which are arranged on each side of a magnet 62 are associated solely with this magnet 62.

In accordance with the invention, the groove 70 that is produced in a lateral face 68 of a first tooth 30, for example here a tooth 30 on the bottom magnet wheel 20, emerges at the base 30a of the first tooth 30, and the groove 70 that is produced in the opposite lateral face 68 of the other tooth 30 emerges at the tip 30b of the second tooth 30.

Thus all the grooves emerge at the same axial end of the rotor 12, here the bottom end of the rotor 12.

The invention also concerns a method for producing a rotor 12 according to which the grooves 70 that receive the magnets 62 emerge axially at the top axial end or at the bottom axial end of the rotor 12, as is the case for example with the embodiment of the rotor according to the invention that was depicted in FIG. 4.

This method comprises a first step of assembling the two magnet wheels 20 together, in particular by mounting both of them on a central shaft (not shown) of the rotor 12.

The method comprises a second step of producing grooves 70 in the lateral faces 68 of the teeth 30 by machining.

According to a preferred embodiment, the step of machining the lateral faces 68 of the teeth 30 consists of a step of milling the teeth 30, so as to produce simultaneously the two grooves 70 in the same pair of grooves 70, which are able to receive the same magnet 62.

For this purpose, the milling cutter used for producing the grooves 70 starts the teeth 30 by their end at which the grooves 70 emerge. That is to say by the bases 30a, 30b of the teeth 30 situated close to the bottom end of the rotor 12 when the two grooves emerge at the bottom end of the rotor 12, and/or by the bases 30a, 30b of the teeth 30 situated close to the top end of the rotor 12 when the two grooves emerge at the top end of the rotor 12.

Finally, the method comprises a step of mounting the magnets 62 in the grooves 70, by introducing them through the emerging ends of the grooves 70.

According to the embodiment of the rotor 12 that is depicted in FIG. 4, the pairs of grooves 70, which each receive a magnet 62, emerge alternately at the top axial end or at the bottom axial end of the rotor 12.

In accordance with the invention, the machining step comprises a first phase of producing the grooves 70 that emerge at a first end of the rotor 12, for example the top end, and then a second phase of machining the other grooves 70 that emerge at the other end of the rotor 12, the bottom end for example. The machining is carried out on one side of the rotor and then on the other side.

In addition, during each of the two phases of producing the grooves 70, the pairs of grooves 70 can be produced successively one after the other.

Thus, during the machining step, the milling cutter used for producing the pairs of grooves 70 travels over a limited distance around the rotor 12 between two machinings of pairs of grooves 70, and the duration of each machining step is then small compared with a conventional machining step according to which all the pairs of grooves 70 are produced successively and independently of the end of the rotor 12 at which the grooves 70 emerge.

The machining of the grooves on each side of the rotor can thus be carried out simultaneously with a tool comprising several milling cutters.

It will be understood that the invention is not limited to the embodiments that have just been described with reference to the figures, and that the rotor 12 can comprise a different number of magnets, and/or that the magnets 62 can be arranged differently on the rotor 12 without departing from the field of the invention.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of producing a rotor comprising the steps of:
   assembling two magnet wheels so that each of a plurality of teeth on each of said magnet wheels is situated in the space existing between two consecutive teeth on the other magnet wheel;
   machining lateral faces of the teeth in order to produce a plurality of grooves receiving each of a plurality of magnetic elements, so that each of the two lateral faces of each tooth comprises one of said plurality of grooves that is able to partly receive one of said plurality of magnetic elements; and
   mounting each magnetic element in two grooves that are produced in the opposite faces of two adjacent teeth;
   wherein the machining step comprises a first phase of producing the plurality of grooves that emerge at a first axial end of the rotor and then a second phase of producing grooves that emerge at a second axial end of the rotor, so that two adjacent teeth each comprise at a maximum only one groove emerging at the base of the tooth.

2. The method according to claim 1, wherein the machining step further comprises the step of:
   machining said grooves so that one groove of said plurality of grooves emerges at a first axial end of the rotor on one of said lateral faces of one of said plurality of teeth that is adjacent another tooth comprising a second one of said plurality of grooves that emerges at a second axial end of the rotor produced, said second one of said plurality of grooves being on a face of said other tooth and opposite said one of said lateral faces comprising said one groove that emerges at said first axial end.

3. The method according to claim 1, wherein each phase of the machining step consists of simultaneously producing the two grooves in a pair of grooves, which are able to receive one and the same magnetic element.

4. The method according to claim 3, wherein the machining step further comprises the step of:
   machining said grooves so that one groove of said plurality of grooves emerges at a first axial end of the rotor on one of said lateral faces of one of said plurality of teeth that is adjacent another tooth comprising a second one of said plurality of grooves that emerges at a second axial end of the rotor produced, said second one of said plurality of grooves being on a face of said other tooth and opposite said one of said lateral faces comprising said one groove that emerges at said first axial end.

5. The method according to claim 3, wherein each phase of the machining step consists of successively producing the pairs of grooves that emerge at the same axial end of the rotor.

6. The method according to claim 5, wherein the machining step further comprises the step of:
   machining said grooves so that one groove of said plurality of grooves emerges at a first axial end of the rotor on one of said lateral faces of one of said plurality of teeth that is adjacent another tooth comprising a second one of said plurality of grooves that emerges at a second axial end of the rotor produced, said second one of said plurality of grooves being on a face of said other tooth and opposite said one of said lateral faces comprising said one groove that emerges at said first axial end.

* * * * *

UNITED STATES PATENT AND TRADEMARK OFFICE
CERTIFICATE OF CORRECTION

PATENT NO. : 8,191,229 B2  
APPLICATION NO. : 13/150519  
DATED : June 5, 2012  
INVENTOR(S) : Rigaud et al.

Page 1 of 1

It is certified that error appears in the above-identified patent and that said Letters Patent is hereby corrected as shown below:

In the Specifications:

In column 6, line 39 after "rotor", please insert --12--.

Signed and Sealed this
Thirteenth Day of August, 2013

Teresa Stanek Rea
*Acting Director of the United States Patent and Trademark Office*